United States Patent
Clegg (10) Patent No.: US 10,927,767 B2
(45) Date of Patent: Feb. 23, 2021

(54) EXOSKELETAL GAS TURBINE ENGINE

(71) Applicant: Rolls-Royce Corporation, Indianapolis, IN (US)

(72) Inventor: Joseph Clegg, Seymour, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 181 days.

(21) Appl. No.: 16/140,145

(22) Filed: Sep. 24, 2018

(65) Prior Publication Data
US 2020/0095943 A1 Mar. 26, 2020

(51) Int. Cl.
*F02C 7/36* (2006.01)
*F02C 3/06* (2006.01)
*F01D 5/03* (2006.01)
*F02C 3/05* (2006.01)
*F02K 3/02* (2006.01)

(52) U.S. Cl.
CPC .................. *F02C 7/36* (2013.01); *F01D 5/03* (2013.01); *F02C 3/05* (2013.01); *F02C 3/06* (2013.01); *F02K 3/025* (2013.01)

(58) Field of Classification Search
CPC .... F02C 7/36; F02C 3/06; F02C 3/107; F02C 3/067; F01D 5/03; F01D 1/26; F01D 1/24; F02K 3/025
See application file for complete search history.

(56) References Cited

U.S. PATENT DOCUMENTS

| 2,360,130 | A | * | 10/1944 | Heppner Fritz | F02C 3/067 60/268 |
| 2,404,767 | A | * | 7/1946 | Heppner Fritz | F02C 3/067 60/262 |
| 4,159,624 | A | * | 7/1979 | Gruner | F02C 3/107 60/268 |
| 5,993,154 | A | | 11/1999 | Endres et al. | |
| 6,151,882 | A | * | 11/2000 | Cavanagh | F02C 3/045 60/226.1 |
| 6,393,831 | B1 | | 5/2002 | Chamis et al. | |
| 6,397,577 | B1 | | 6/2002 | Sondergaard | |
| 8,720,205 | B2 | | 5/2014 | Lugg | |

(Continued)

OTHER PUBLICATIONS

Chamis, Christos C., et al., Exo-Skeletal Engine—Novel Engine Concept, Glenn Research Center, Cleveland, Ohio, NASA™—2004-212621, Jan. 2004 (22 pages).

(Continued)

*Primary Examiner* — Andrew H Nguyen
(74) *Attorney, Agent, or Firm* — Barnes & Thornburg LLP (57) ABSTRACT

An exoskeletal gas turbine engine having a rotatable outer shaft and an inner stationary case enclosed in a casing. The engine comprises a compressor section at an inlet end, a combustor section, and a turbine section at an outlet end. Rotating compressor blades and turbine blades are attached to, and extend radially inward from, an inner surface of the outer shaft. Stationary vanes are attached, and extend radially outward from, an outer surface of the inner stationary case. The outer shaft rotates around a front bearing and a rear bearing. An inlet compressor blade arrangement is attached to the outer race of the front bearing. An outlet turbine blade arrangement is attached to the outer race of the rear bearing. The inner race of the front and rear bearings attach to the inner stationary case.

17 Claims, 8 Drawing Sheets

(56) References Cited

U.S. PATENT DOCUMENTS

| | | |
|---|---|---|
| 2003/0029171 A1 | 2/2003 | Cahill |
| 2007/0126292 A1 | 6/2007 | Lugg |
| 2013/0000322 A1* | 1/2013 | Silkowski ............... F02C 3/067 |
| | | 60/792 |
| 2017/0254266 A1 | 9/2017 | Milani et al. |

OTHER PUBLICATIONS

Roche, Jospeh M., et al., Investigation of Exoskeletal Engine Propulsion System Concept, NASA™—2005-213369, Aug. 2005 (93 pages).

* cited by examiner

EXOSKELETAL GAS TURBINE ENGINE

FIELD OF DISCLOSURE

The present invention relates to gas turbine engines, and more particularly, to gas turbine engines in which blades are attached to a rotating outer shaft.

BACKGROUND

The current typical gas turbine engine includes a compressor section followed by a combustion section and a turbine section. The compressor and turbine sections include blades attached to a shaft that rotates along a central axis. The compressor section and turbine section may be surrounded by a stationary, or non-rotating, casing. In some configurations, a fan is attached at an air intake upstream from the compressor section to enhance airflow into the compressor section and to create a bypass air inlet between the casing and a nacelle.

The compressor and turbine blades are typically mounted on cylindrical disks co-centrically arranged and configured to rotate using power from the central shaft. These disks are heavy and difficult to balance. The outer casing is typically made of metal and gets very hot, which is radiated to the surrounding area. The blade and vane arrangements in the compressor and turbine sections may result in air leakage, which lowers aero efficiency. The turbine disks can also have such a high level of rotating inertia that if there is a failure, the metallic outer case may not be able to contain the disk from being liberated from the engine. The turbine blades are also in tension resulting in creep, thermal expansion, and transient shock waves that can shorten the life of the engine.

Certain types of gas turbine engines, known as exoskeletal gas turbine engines, in which the blades are attached to a rotating outer housing surrounding a non-rotating case extending along the central axis of the engine have been considered and investigated for use as an alternative to the traditional gas turbine engines. However, it is believed the development of exoskeletal engines has not resulted in any established or non-experimental use of exoskeletal engines in either civil or defense applications.

SUMMARY

In view of the above, an exoskeletal gas turbine engine includes a rotatable outer shaft containing a compressor section and a turbine section. The outer shaft is enclosed in an exterior stationary casing attached to a stationary inlet housing at an inlet end of the exterior stationary casing and to a stationary outlet housing at an outlet end of the exterior stationary casing. The compressor section includes a plurality of compressor blade arrangements comprising compressor blades attached to, and extending radially inward from, an inner surface of the outer shaft. The compressor blade arrangements are mounted in outer shaft cross-sections of the compressor section and having an inlet compressor blade arrangement mounted at an inlet end of the compressor section. The turbine section includes a plurality of turbine blade arrangements comprising turbine blades attached to, and extending radially inward from, the inner surface of the rotatable outer shaft. The turbine blade arrangements are mounted in outer shaft cross-sections of the turbine section. An outlet turbine blade arrangement is mounted at an outlet end of the turbine section. An inner stationary case is attached at one end to the stationary inlet housing and extends to attach to the stationary outlet housing. A plurality of vane arrangements comprising vanes are attached to, and extend radially outward from, an outer surface of the inner stationary case. The vane arrangements are positioned adjacent each compression blade arrangement and each turbine blade arrangement to guide air flow through the rotating compressor blades and turbine blades. A combustor section is disposed between the compressor section and turbine section. A front bearing and a rear bearing each comprise an inner race mounted on the inner stationary case. Each comprise an outer race. The outer race of the front bearing is attached to the front compressor blade of the inlet compressor blade arrangement and the outer race of the rear bearing is attached to the last stage of turbine blades of the outlet turbine blade arrangement.

DETAILED DESCRIPTION

Figure 1A:
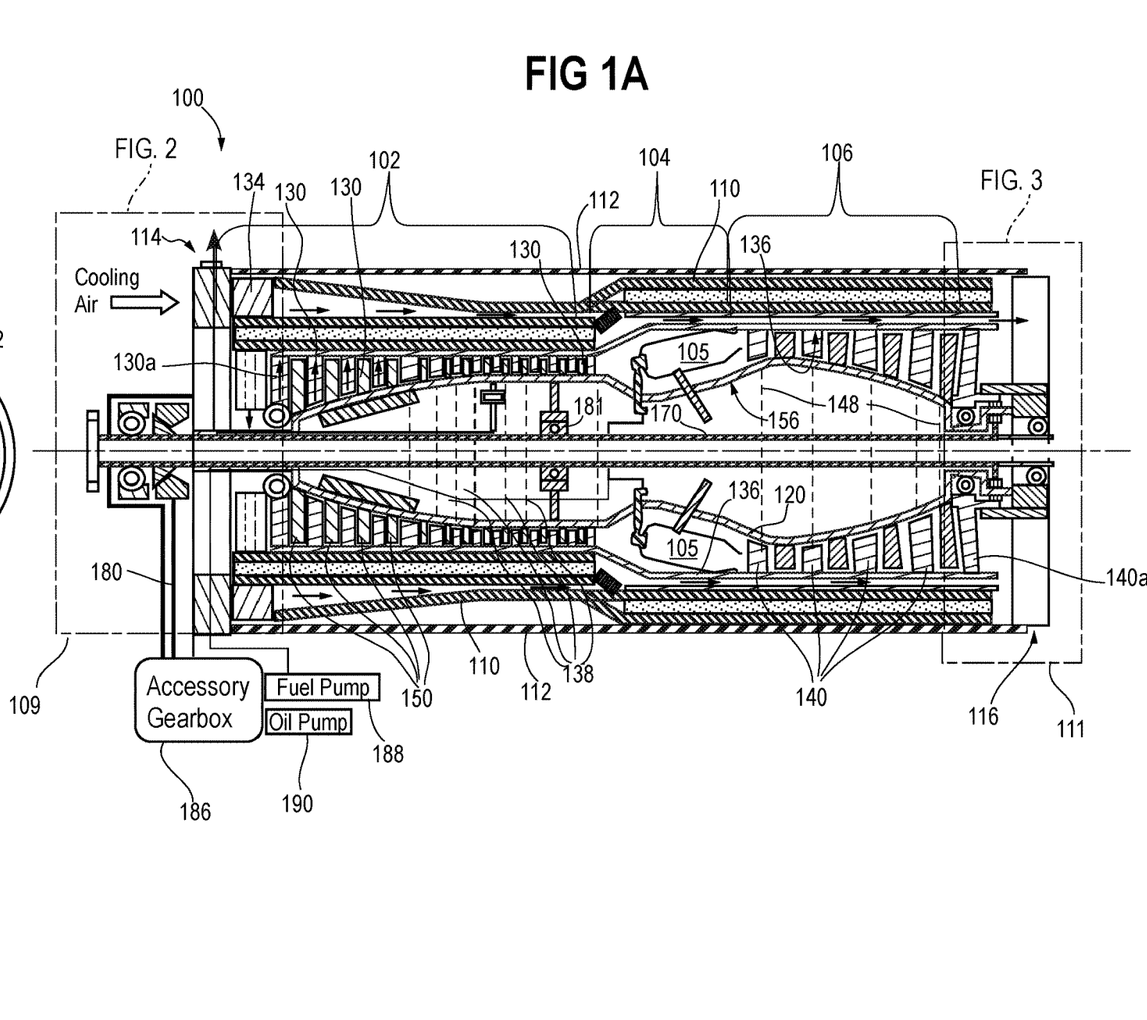
FIG. 1A is a side cross-sectional view of an example of an exoskeletal gas turbine engine.
Figure 1B:
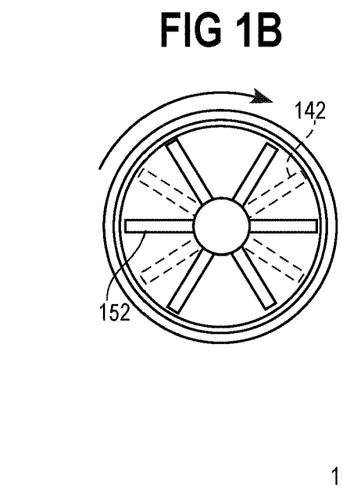
FIG. 1B is a front cross-sectional view of an example of the exoskeletal gas turbine engine in FIG. 1A.
Figure 1C:
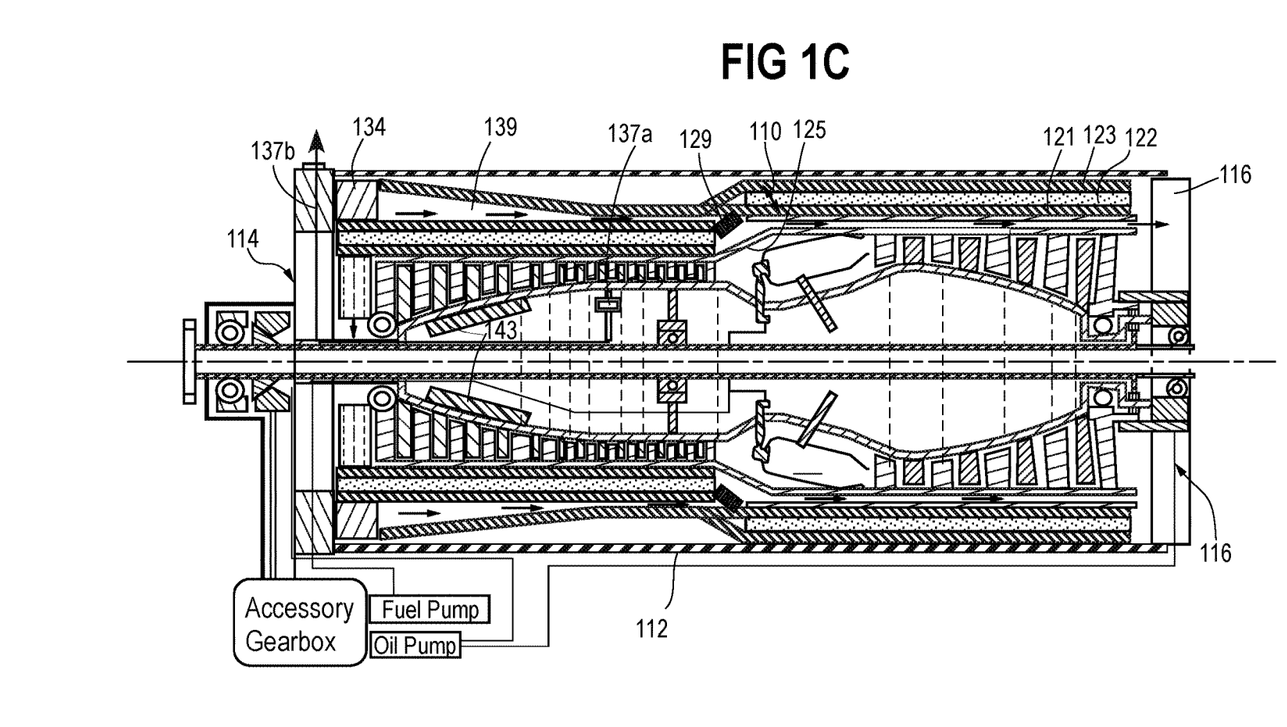
FIG. 1C is another side cross-sectional view of the exoskeletal gas turbine engine in FIG. 1A.
Figure 1D:
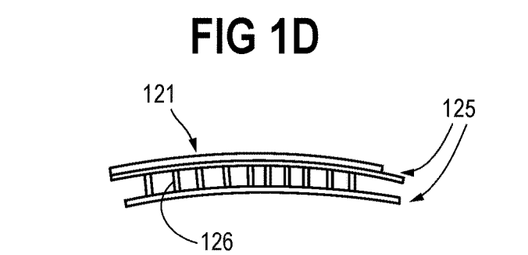
FIG. 1D is an enlarged front cross-sectional view of the layers forming the outer shaft.

FIG. 1A is a side cross-sectional view of an example of a gas turbine engine 100. The gas turbine engine 100 in FIG. 1A comprises a compressor section 102, a combustor section 104, and a turbine section 106. FIG. 1B is a front cross-sectional view of an example of the exoskeletal gas turbine engine in FIG. 1A. FIG. 1C is another side cross-sectional view of the exoskeletal gas turbine engine in FIG. 1A. FIG. 1D is an enlarged front cross-sectional view of the layers forming the outer shaft.

Referring to FIGS. 1A-1D, the gas turbine engine 100 comprises a rotatable outer shaft 110 enclosed in an exterior stationary casing 112 attached to a stationary inlet housing 114 at an inlet end of the casing 112 and to a stationary outlet housing 116 at an outlet end of the casing 112. An inner stationary case 120 formed around a central axis of the gas turbine engine 100 is attached at one end to the stationary inlet housing 114 and extends to attach to the stationary outlet housing 116.

In the compressor section 102, a plurality of compressor blade arrangements 130 comprises a plurality of compressor blades 132 attached to, and extending radially inward from, an inner surface 136 of the outer shaft 110. The compressor blade arrangements 130 are mounted in outer shaft cross-sections 138 of the compressor section 102. Each compressor blade 132 in each compressor blade arrangement 130 attaches to the inner surface 136 of the outer shaft 110 along a circumference defining each of the outer shaft cross-sections 138. An inlet compressor blade arrangement 130a is mounted at an inlet end of the compressor section 102. The compressor section 102 extends downstream to interface with the combustor section 104 at an outlet end of the compressor section 102.

In the turbine section 104, a plurality of turbine blade arrangements 140 comprising a plurality of turbine blades 142 attached to, and extending radially inward from, the inner surface 136 of the rotatable outer shaft 110. The turbine blade arrangements 140 are mounted in outer shaft cross-sections 148 of the turbine section 104. Each turbine blade 142 in each turbine blade arrangement 140 attaches to the inner surface 136 in the turbine section 104 of the outer shaft 110 along a circumference defining each of the outer shaft cross-sections 148. An outlet turbine blade arrangement 140a is mounted at an outlet end of the turbine section 104.

The inner stationary case 120 is formed to house fuel conduits, which connect to fuel injectors to fuel a set of combustors 105. The inner stationary case 120 provides a space that is cooler than the surrounding space through the compressor blades and the turbine blades to house oil conduits, a compressor air bleed 137a (in FIG. 1C) with an bleed conduit 137b, a compressor guide vane actuator 143, as well as other components and mechanisms that should operate in a cooler environment. A plurality of vane arrangements 150 comprising a plurality of vanes 152 are attached to, and extend radially outward from, an outer surface 156 of the inner stationary case 120. The vane arrangements 152 are mounted in cross-sections of the inner stationary case 120 such that a vane arrangement 152 is positioned adjacent each compression blade arrangement and each turbine blade arrangement to guide air flow through the rotating compressor blades and turbine blades. The plurality of vanes 152 in the compressor section 102 of the engine 100 may be moved using the compressor guide vane actuator 143 to control the volume of air flow through the compressor section 152. The compressor guide vane actuator 143 may be advantageously mounted in the inner stationary case 120 to operate in a cooler environment.

Figure 2:
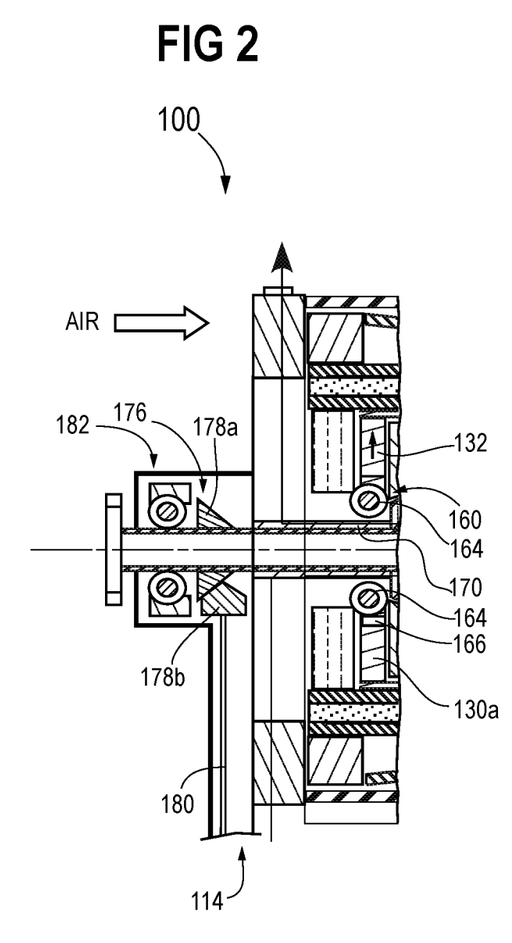
FIG. 2 is an enlarged view of the section labeled FIG. 2 in FIG. 1A.
Figure 3:
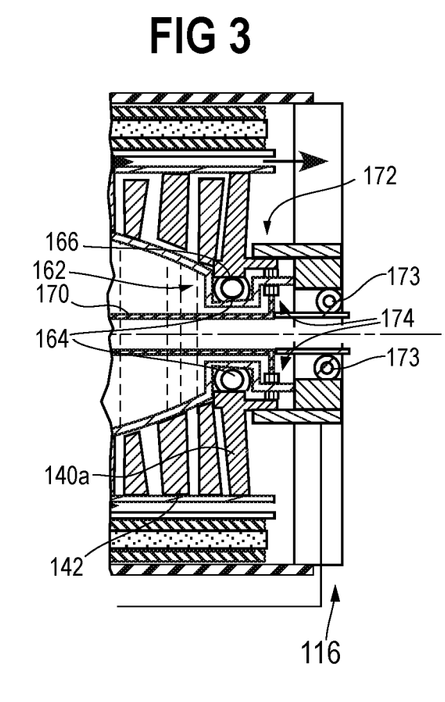
FIG. 3 is an enlarged view of the section labeled FIG. 3 in FIG. 1A.

FIG. 2 is an enlarged view of the section labeled FIG. 2 in FIG. 1A depicting the stationary inlet housing 114 and an example of support structure that enables the outer shaft 110 to rotate around the inner stationary case 120 at the inlet end of the gas turbine engine 100. FIG. 3 is an enlarged view of the section labeled FIG. 3 in FIG. 3 depicting the stationary outlet housing and an example of support structure that enables the outer shaft 110 to rotate around the inner stationary case 120 at the outlet end of the gas turbine engine 100. The support structure shown in FIGS. 2 and 3 include a front bearing 160 and a rear bearing 162. The outer shaft 110 rotates around the inner stationary case 120 while supported by the front bearing 160 at the inlet end of the gas turbine engine 100, and by the rear bearing 162 at the outlet end of the engine 100. The front bearing 160 and the rear bearing 162 each have an inner race 164 and an outer race 166. The inner race 162 of the front bearing 160 and the rear bearing 162 is mounted on the inner stationary case 120. The outer race 166 of the front bearing 160 is attached to the compressor blades 132 forming the inlet compressor blade arrangement 130a. The outer race 166 of the rear bearing 162 is attached to the turbine blades 142 of the outlet turbine blade arrangement 140a.

It is noted that attachment of the outer race 166 of the front bearing 160 to the compressor blades 132 of the inlet compressor blade arrangement 130a and the outer race 166 of the rear bearing 162 to the turbine blades 142 of the outlet turbine blade arrangement 140a allows for the use of bearings having a diameter substantially less than the diameter of the outer shaft 110. In some embodiments, bearings of the size and type typically used in traditional gas turbine engines in which the compressor blades and the turbine blades are attached to a rotating shaft on the central axis of the engine may be used for the front bearing 160 and the rear bearing 162. Known exoskeletal gas turbine engine designs employ bearings having a large diameter, typically as large as, or larger than the diameter of the rotating shaft. In general, the faster the speed of the bearing, the higher the stress and challenge to lubrication.

During operation of the gas turbine engine 100 intake air flows into the gas turbine engine 100 at the inlet end of the compressor section 102 and through the rotating outer shaft 110 and the turbine section 106 to generate thrust. The outer shaft 110 rotates about the central axis of the gas turbine engine 100 and the inner stationary case 120. The compressor blades in the compressor section 102 pressurize the intake air as the air flows between the vanes and rotating compressor blades to the combustor section 104. The combustors heat the air increasing the air pressure of the air flowing into the turbine section 106. The air flows between the stationary vanes and rotating turbine blades in the turbine section 106 to the outlet end of the engine.

The gas turbine engine 100 is an "exoskeletal" gas turbine engine in that the compressor blades and turbine blades are attached to the rotating outer shaft 110. The compressor and turbine blades are therefore in compression under less stress than blades attached to a rotating inner shaft. The exoskeletal gas turbine engine 100 is also substantially lighter than traditional gas turbine engines, which typically mount the compressor and turbine blades on heavy disks. The outer shaft 110 may be made of much lighter materials as described below with reference to FIGS. 1C and 1D.

In an example implementation, the gas turbine engine 100 may include a power drive shaft 170 extending along the central axis of the engine 100 in the inner stationary case 120. In an example implementation, as shown in FIG. 1A, the power drive shaft 170 may extend along the central axis of the engine 100 the length of the engine 100 or longer. In other implementations, such as for example, the example described below with reference to FIGS. 6 and 7, the power drive shaft 170 may only extend for a length that is less than that of the engine 100. Referring to FIGS. 1A and 3, the gas turbine engine 100 includes a power shaft gear arrangement 172 comprising a plurality of gears 174 configured to transfer rotation of the outer shaft 110 to the power drive shaft 170. In an example implementation, the power shaft gear arrangement 172, as shown in FIG. 3, is a planetary gear system. The power shaft gear arrangement 172 provides a rotational force to the power drive shaft 170, which may be configured to drive at least one accessory apparatus. Examples of accessory apparatuses include an electric generator, pumps (e.g. a fuel pump, oil pump, coolant pump, etc.), or any other rotating mechanism.

The power drive shaft 170 may drive the accessory apparatus directly for mechanisms that mount on the same axis as the power drive shaft 170. The power drive shaft 170 may also connect to a power shaft converter 176 configured to drive a secondary power shaft in a different direction. The power shaft converter 176 may include a first gear 178a mounted on the power drive shaft 170 at a first gear angle configured to mate with a second gear 178*b* mounted on a secondary power shaft 180 (in FIGS. 1A and 2) extending from the power drive shaft 170 at a secondary power shaft angle. In an example implementation, the first gear 178*a* is a bevel gear configured to drive the second gear 178*b*, which may be a corresponding bevel gear, to drive the secondary power shaft 180 at a secondary power shaft angle of about 90°.

Additional gear systems may be connected to the secondary power shaft 180 to use the rotational mechanical power of the secondary power shaft 180 to drive other mechanisms. FIG. 2 shows an accessory gear box 186 configured to drive a fuel pump 188 and an oil pump 190 using the rotation of the secondary power shaft 180. It is noted that the accessory gear box 186 and secondary power shaft 180 are optional and may not be included in some implementations. The accessory gear box 186 may also be configured to drive other mechanisms besides oil pumps or fuel pumps. For example, an implementation that includes a liquid cooling system may include a coolant pump controlled by the accessory gear box 186. It is further noted gear systems that may be used to implement the accessory gear box 186, the secondary power shaft 180, and power shaft converter 176 are well-known to those of ordinary skill in the art. Any arrangement of gears suitable for control of the accessory apparatuses selected to be driven by the rotation of the power drive shaft 170 may be used in example implementations.

The power shaft converter 176 shown in FIGS. 1A, 2 and 3 is mounted in the inlet housing 114. The power drive shaft 170 extends from a front end at the inlet end of the gas turbine engine 100 to a rear end at the outlet end of the gas turbine engine 100. In the example shown in FIGS. 1A, 2 and 3, the front end of the power drive shaft 170 is supported by a front power shaft bearing 182 mounted in front of the inlet housing 114. The inlet housing 114 includes the front bearing 160 rearward to support the power shaft converter 176 in addition to the power drive shaft 170. A center power drive shaft bearing 181 may be included at a downstream end of the compressor section 102 forward of the combustor section 104 to support a central portion of the power drive shaft 170. The power shaft gear arrangement 172 shown in FIG. 2 is mounted in the stationary outlet housing 116. The rear end of the power drive shaft 170 is supported by a rear power shaft bearing 173. Other arrangements for supporting and driving the power drive shaft 170 may be implemented. An example of an alternative arrangement is described below with reference to FIGS. 6 and 7.

In example implementations, the outer shaft 110 may be made of metal of sufficient thickness to support the attached compressor blades and turbine blades. Gas turbine engines with blades attached to an axially rotating shaft typically comprise compressor disks and turbine disks attached to each other along the axis of rotation adding significantly to the weight of the engine. The outer shaft 110 in the exoskeletal gas turbine engine 100 may be made of metal of sufficient thickness to support the compressor and turbine blades.

The outer shaft 110 in FIG. 1C is formed of metal of sufficient thickness 125 covered on the outer surface by a first layer 121 of a non-metallic composite material. A second layer 123 may surround the first layer 121 and may include a honeycomb layer 122 sandwiched between the layers 121 and 123 of non-metallic composite material. The non-metallic composite layer 122 may be applied as a single strand similar to how non-metallic composites are applied to high pressure propellant tanks. The non-metallic composite layer 122 may also be applied in a multi-strand pattern using a 3-D weaver machine.

The outer shaft 110 may also include a plurality of fan blades 134 attached to the outer shaft 110 at the inlet end of the gas turbine engine 100 and extending radially towards the casing 112. The fan blades 134 provide an air flow at the inlet end of the engine 100. An annular air duct 139 may be formed by enclosing the compressor section 102 with an additional non-metallic composite material layer 141. The air duct 139 may extend through the space formed between the additional non-metallic composite material layer 141 and the second layer of non-metallic composite material 123 in the compressor section to a cooling air flow inlet 129 at the interface between the compressor section 102 and the combustor section 104. The cooling air flow inlet 129 provides cooling air from the fan blades 134 to the outer case of the combustor section 104.

The cooling air may then enter a second annular air duct to cool turbine section 106 of the outer shaft 110. FIG. 1D is an enlarged front cross-sectional view of the layers forming the outer shaft. As shown in FIG. 1D, the outer shaft 110 in the turbine section 106 may have two metallic layers 125 separated by a space. The first layer 121 of non-metallic composite material is formed on the outer metallic layer 125. A plurality of radial ribs 126 may be formed between the two metallic layers 125 and extend longitudinally towards the outlet end of the turbine section 106. The second annular air duct is formed as multiple longitudinal channels surrounding the outer shaft 110 and extending longitudinally in the turbine section 106.

Figure 4:
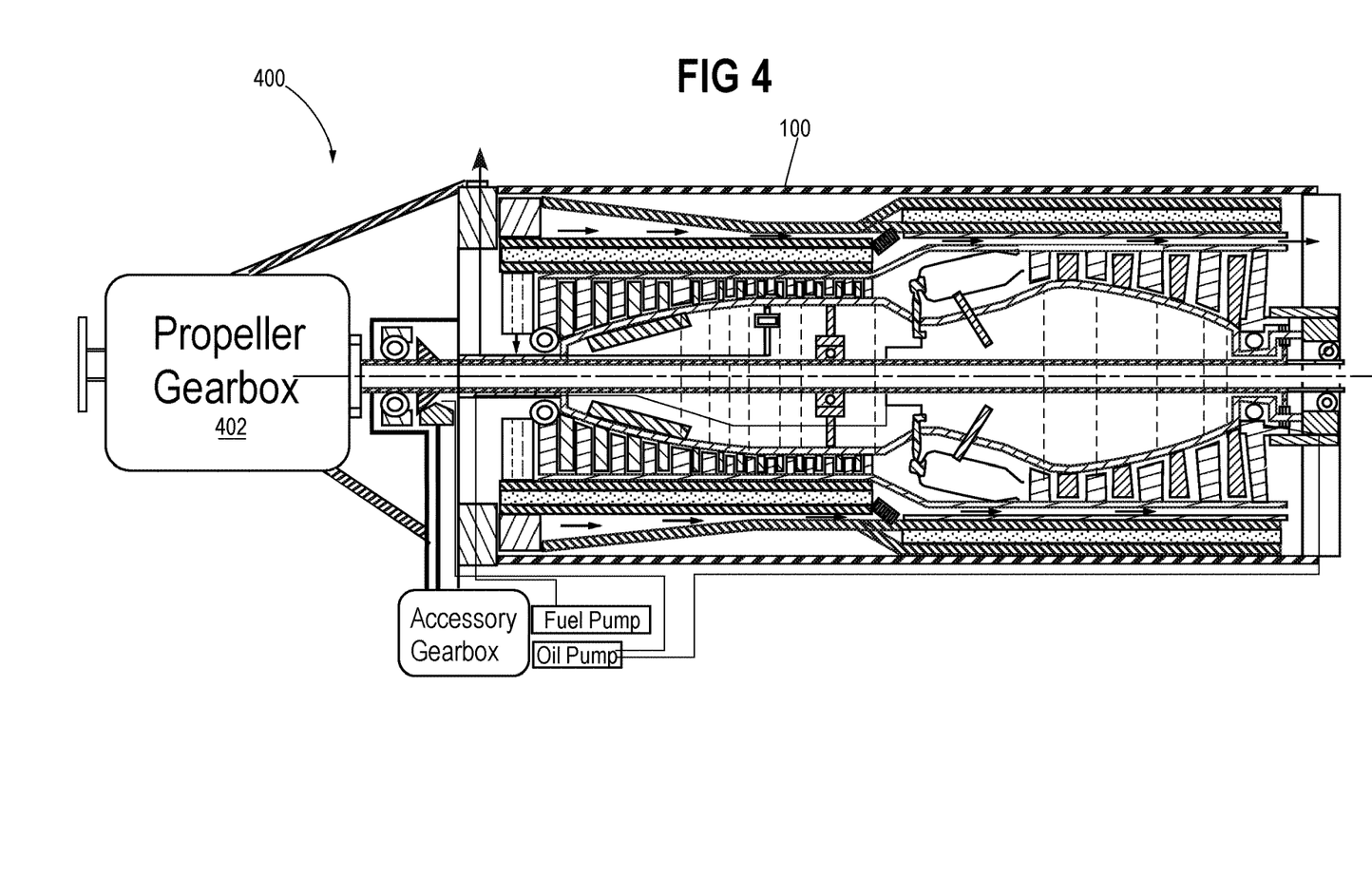
FIG. 4 is another side cross-sectional view of the exoskeletal gas turbine engine in FIG. 1A configured to drive a propeller gear box.
Figure 5:
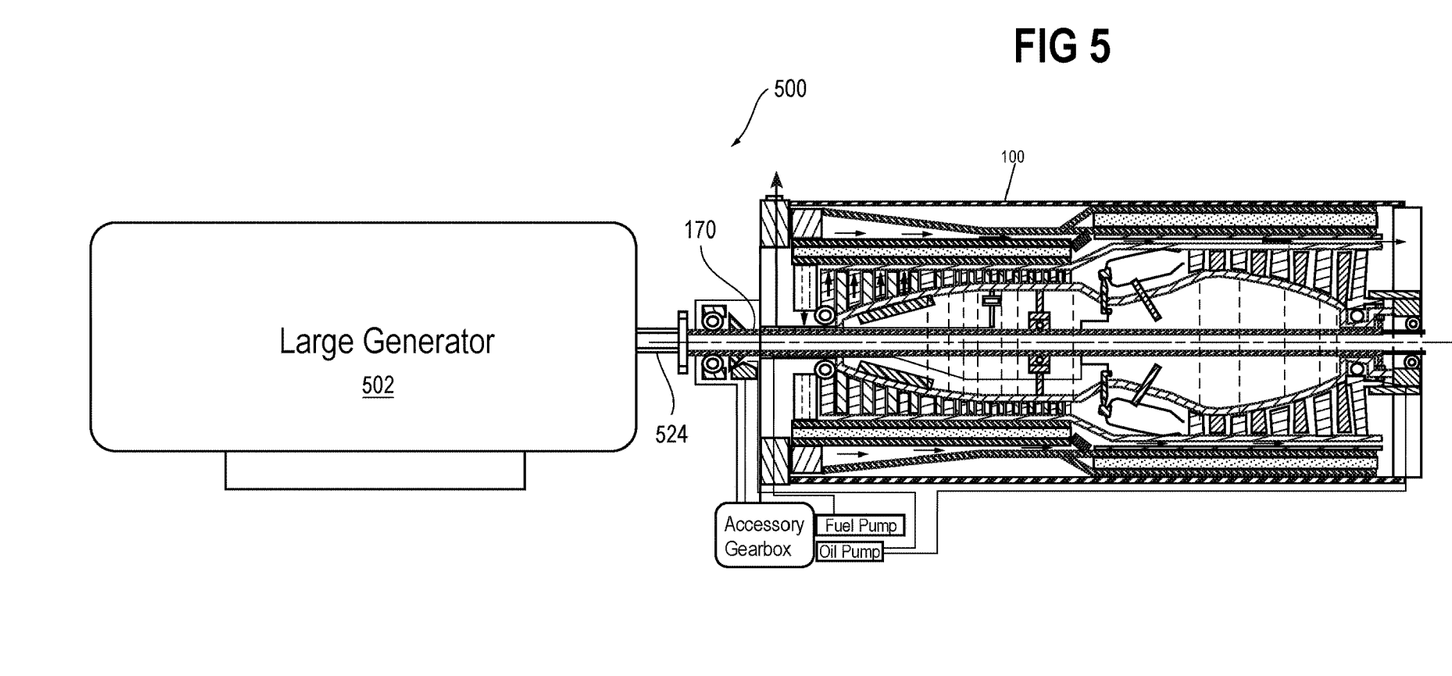
FIG. 5 is another side cross-sectional view of the exoskeletal gas turbine engine in FIG. 1A configured to drive an electric generator.

As noted above, the power drive shaft 170 that rotates in the inner stationary case 120 may be configured to provide rotational power for other rotating mechanisms. FIG. 4 is another side cross-sectional view 400 of the exoskeletal gas turbine engine 100 in FIG. 1A configured to drive a propeller gear box 402. The propeller gear box 402 may be used to drive a propeller and employ the engine as a turbo-prop engine. FIG. 5 is another side cross-sectional view 500 of the exoskeletal gas turbine engine 100 in FIG. 1A configured to drive an electric generator 502. The electric generator 502 may comprise a rotor 504 coupled to the power drive shaft 170. The electric generator 502 may be used to provide electrical power to the rest of the aircraft or may assist in providing thrust in a hybrid system.

Figure 6:
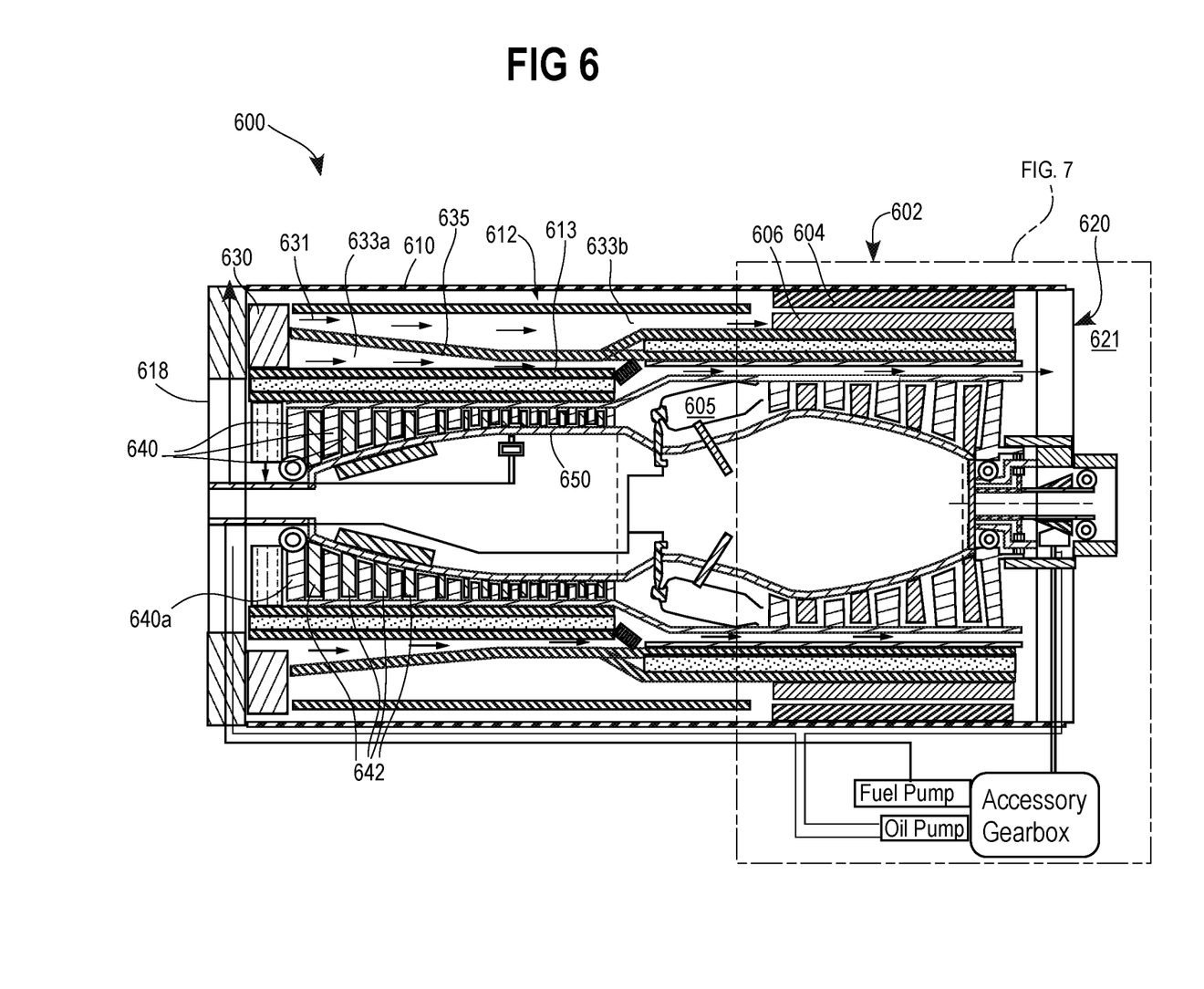
FIG. 6 is a cross-sectional view of another example of an exoskeletal gas turbine engine configured to drive an electric generator formed on the outer shaft.

FIG. 6 is a cross-sectional view of another example of an exoskeletal gas turbine engine 600 configured to drive an electric generator 602 formed without the use of the power drive shaft 170 (in FIG. 1A). The exoskeletal gas turbine engine 600 in FIG. 6 includes a rotatable outer shaft 612 contained in a casing 610 and to which a plurality of compressor blade arrangements 640 are attached. A plurality of vane arrangements 642 are positioned in alternating cross-sections with the blade arrangements 640. The compressor blades in a first compressor blade arrangement 640*a* are attached to a rotating outer race of an inlet bearing. The stationary inner race of the inlet bearing is attached to an inner stationary case 650. An inlet stationary housing 618 is attached to the exterior stationary casing 610 at the inlet end of the engine 100 and an outlet stationary housing 620 is attached to the exterior stationary casing 610 at the outlet end. The outer shaft 612 may be formed as a metal layer of sufficient thickness covered by a non-metallic composite layer 613, which may comprise a honeycomb layer and another non-metallic composite layer on an outer surface of the honeycomb as described above with reference to FIG. 1C. A fan 630 implemented as a plurality of fan blades attached to the inlet end of the outer shaft 612 may be provided to draw cooling air 631 into a first annular air duct 633a and a second annular air duct 633b. The first and second annular air ducts 633a,b may be formed as concentric air spaces separated by an intermediate non-metallic composite layer 635. The first annular air duct 633a may extend downstream to the cooling air flow inlet, which provides cooling air to a third annular air duct surrounding the turbine section of the engine 600. The second annular air duct 633b may extend downstream to cool the annulus between 604 and 606 of the electrical generating device.

Figure 7:
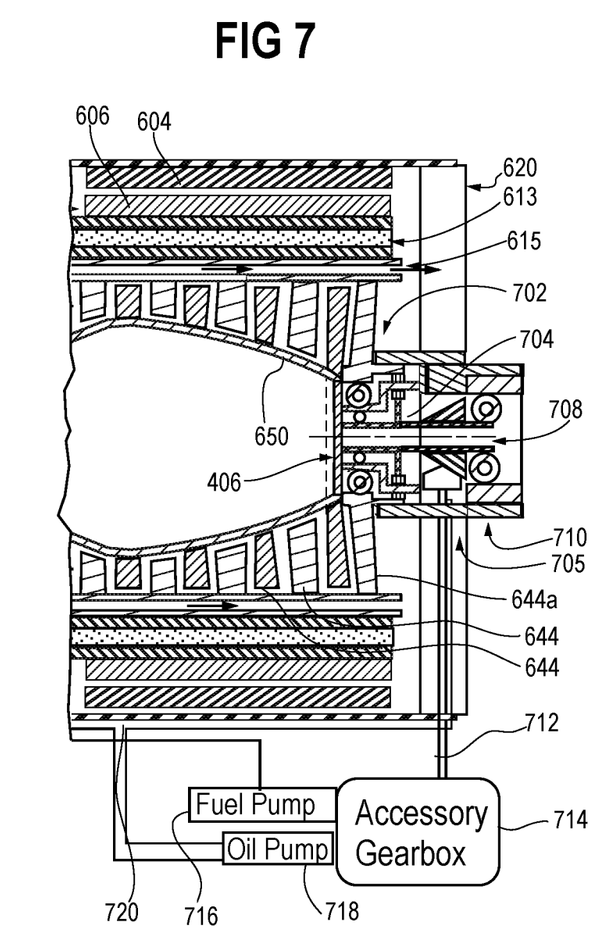
FIG. 7 is an enlarged view of the section labeled FIG. 7 in FIG. 6.

Referring to FIG. 7, which is an enlarged view of the section labeled FIG. 7 in FIG. 6, the space between the casing 610 and the outer shaft 612 surrounding the turbine section of the engine 600 includes the electric generator 602 formed by a stationary stator 604 lining an inner surface of the exterior stationary casing 610 and a rotor 606 lining an outer surface of the outer shaft 610. The stationary stator 604 and rotor 606 may be formed to operate as any suitable electric generator, including for example, a permanent magnet brushless electric motor or generator. The rotor 606 may be formed on a layer of non-metallic composite covering the metal layer of sufficient thickness of the outer shaft 612. The non-metallic composite material and metal of sufficient thickness configuration may be implemented as described above with reference to FIGS. 1C and 1D.

As shown in FIG. 7, the turbine section includes a plurality of turbine blade arrangements 644a, 644b, and 644c. The first turbine blade arrangement 644a at the outlet end of the turbine section attaches to a rear bearing 702 outer race to permit rotation about the inner stationary case 650. A power drive shaft 708 extends from a power shaft bearing 706 disposed within the inner stationary case 650 and power drive shaft 708. The outer race of the power shaft bearing 706 attaches to the inner stationary case 650 and is therefore stationary. The inner race of the power shaft bearing 706 permits rotation of the power drive shaft 708. The power drive shaft 708 in FIG. 7 is advantageously much shorter in length than the power drive shaft 170 described above with reference to FIG. 1A. The power drive shaft 708 is powered by a power shaft gear arrangement 704, which attaches to the rotating last turbine blade arrangement 644a. The power shaft gear arrangement 704 may be implemented using a planetary gear system as described above. A power shaft converter 705 includes gears, such as beveled gears to drive a secondary power drive shaft 712. The secondary power drive shaft 712 may connect to an accessory gearbox 714, which may be used to drive a fuel pump 716, an oil pump 718, or any other mechanism. The fuel and oil conduits 720 attach to the fuel pump 716 and oil pump 718, respectively, and are routed to the interior of the inner stationary case 650 (see FIG. 6).

Various arrangements of exoskeletal gas turbine engines have been described above along with optional features and modifications for a variety of different example implementations. For example, the exoskeletal gas turbine engine 100 described above with reference to FIG. 1A may or may not include the power drive shaft 170, or any other accessory mechanisms. The exoskeletal gas turbine engine 600 described with reference to FIG. 6 may or may not include the shortened power drive shaft 708 or may be implemented with the shortened power drive shaft 708 but not the electric generator 602. No description above of any examples or features is intended as any limitation of the scope of the invention.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

What is claimed is:

1. A gas turbine engine comprising:
   a rotatable outer shaft, wherein the outer shaft is enclosed in an exterior stationary casing attached to a stationary inlet housing at an inlet end of the exterior stationary casing and to a stationary outlet housing at an outlet end of the exterior stationary casing, the gas turbine engine being divided into a compressor section, a combustor section, and a turbine section;
   a plurality of compressor blade arrangements comprising compressor blades attached to, and extending radially inward from, an inner surface of the outer shaft, wherein the compressor blade arrangements are mounted in outer shaft cross-sections of the compressor section and having an inlet compressor blade arrangement mounted at an inlet end of the compressor section;
   a plurality of turbine blade arrangements comprising turbine blades attached to, and extending radially inward from, the inner surface of the rotatable outer shaft, wherein the turbine blade arrangements are mounted in outer shaft cross-sections of the turbine section and having an outlet turbine blade arrangement mounted at an outlet end of the turbine section;
   an inner stationary case attached at one end to the stationary inlet housing and extending to attach to the stationary outlet housing;
   a plurality of vane arrangements comprising vanes attached to, and extending radially outward from, an outer surface of the inner stationary case, wherein respective vane arrangements of the plurality of vane arrangements are positioned adjacent each compressor blade arrangement of the plurality of compressor blade arrangements and each turbine blade arrangement of the plurality of turbine blade arrangements to guide air flow through the compressor blades and the turbine blades;
   a front bearing and a rear bearing, each comprising an inner race mounted on the inner stationary case and an outer race, wherein the outer race of the front bearing is attached to the compressor blades of the inlet compressor blade arrangement and the outer race of the rear bearing is attached to the turbine blades of the outlet turbine blade arrangement; and
   a power drive shaft extending along a central axis in the inner stationary case.

2. The gas turbine engine of claim 1 further comprising:
a front power shaft bearing mounted in an inlet end of the gas turbine engine to support a front end of the power drive shaft; and
a rear power shaft bearing mounted in an outlet end of the gas turbine engine to support a rear end of the power drive shaft.

3. The gas turbine engine of claim 2 further comprising:
a center power shaft bearing mounted in the inner stationary case in the compressor section forward of an interface between the compressor section and the combustor section to support a center portion of the power drive shaft.

4. The gas turbine engine of claim 1 further comprising: a power shaft gear arrangement mounted on the inner stationary case and comprising a plurality of gears to transfer rotation of the outer shaft to the power drive shaft, wherein the power shaft gear arrangement is configured to drive at least one accessory apparatus via the power drive shaft.

5. The gas turbine engine of claim 4 further comprising: a power shaft converter comprising a first gear mounted on the power drive shaft at a first gear angle configured to mate with a second gear mounted on a secondary power shaft extending from the power drive shaft at a secondary power shaft angle.

6. The gas turbine engine of claim 5 where:
the power shaft converter is mounted in the stationary inlet housing, the power shaft gear arrangement is mounted in the stationary outlet housing, the power drive shaft is supported by a front power shaft bearing mounted forward of the power shaft converter and by a rear power shaft bearing mounted at a rear side of the power shaft gear arrangement.

7. The gas turbine engine of claim 5 wherein the first gear and the second gear are bevel gears configured to rotate the secondary power shaft by rotation of the power drive shaft at a selected angle.

8. The gas turbine engine of claim 5 further comprising:
an accessory driver mounted on the secondary power shaft, the accessory driver configured to provide mechanical power to the at least one accessory apparatus.

9. The gas turbine engine of claim 8 wherein the at least one accessory apparatus includes any of a fuel pump, an oil pump, or both.

10. The gas turbine engine of claim 4 wherein: the power shaft gear arrangement is mounted in the outlet housing, and the power drive shaft has a front end and a rear end, where the front end of the power drive shaft is supported by a front power shaft bearing having an outer race supported by an inner stationary case portion of the inner stationary case supporting the inner race of the front bearing, and the rear end of the power drive shaft is supported by a rear power shaft bearing mounted at a rear side of the power shaft gear arrangement.

11. The gas turbine engine of claim 4 wherein the at least one accessory apparatus includes a propeller gear box coupled to the power drive shaft.

12. The gas turbine engine of claim 1 further comprising an electrical generator coupled to the power drive shaft.

13. The gas turbine engine of claim 1 further comprising:
a plurality of fan blades attached to an outer surface of the outer shaft and extending radially in an annular air duct between the outer shaft and the exterior stationary casing.

14. The gas turbine engine of claim 1 wherein the outer shaft is made of a metal having a thickness sufficient to support the compressor blades and the turbine blades during rotation of the outer shaft.

15. The gas turbine engine of claim 1 wherein the outer shaft comprises: a metallic layer having a thickness sufficient to support the compressor blades and the turbine blades during rotation of the outer shaft; and a non-metallic composite layer covering the metallic layer.

16. The gas turbine engine of claim 15 wherein the non-metallic composite layer comprises a first layer made of a non-metallic composite material, a second layer made of a non-metallic composite material, and a third layer between the first layer and the second layer made of a nonmetallic composite honeycomb patterned layer.

17. The gas turbine engine of claim 1 wherein the outer shaft comprises a first metallic layer of sufficient thickness surrounding a second metallic layer of sufficient thickness separated by a plurality of radial ribs extending longitudinally to form a plurality of longitudinal channels.

* * * * *